United States Patent [19]

Siegel

[11] Patent Number: 4,858,286
[45] Date of Patent: Aug. 22, 1989

[54] PLASTIC INTERLOCKING FASTENER STRIPS

[75] Inventor: Karl-Heinz Siegel, Nuremberg, Fed. Rep. of Germany

[73] Assignee: Minigrip, Inc., Orangeburg, N.Y.

[21] Appl. No.: 197,427

[22] Filed: May 23, 1988

[30] Foreign Application Priority Data

Sep. 3, 1987 [DE] Fed. Rep. of Germany ....... 3729519
Oct. 15, 1987 [DE] Fed. Rep. of Germany ....... 3734993

[51] Int. Cl.⁴ ............................................. A65D 33/16
[52] U.S. Cl. ...................................... 24/587; 24/576; 383/63
[58] Field of Search ................ 24/587, 576, 399, 460, 24/461, 462; 383/63, 65, 35

[56] References Cited

U.S. PATENT DOCUMENTS

| 2,144,755 | 1/1939 | Freedman | 24/587 |
| 2,978,769 | 4/1961 | Harrah | 24/587 |
| 3,172,443 | 3/1965 | Ausnit | 383/63 |
| 4,484,352 | 11/1984 | Katzin | 383/65 |
| 4,561,109 | 12/1985 | Herrington | 24/587 |
| 4,682,366 | 7/1987 | Ausnit et al. | 24/587 |
| 4,691,373 | 9/1987 | Ausnit | 24/576 |
| 4,736,451 | 4/1988 | Ausnit | 24/587 |

*Primary Examiner*—Victor N. Sakran

[57] ABSTRACT

A fastener structure having continuous interlocking flexible plastic profiles on opposing strips adapted to be releasably interlocked to each other, each strip having a pair of ribs and a pair of grooves wherein each rib and each groove of the pairs are of the same size and shape, a blocking boss extending continuously along the outermost of the ribs to engage a rib of the other strip when the strips are misaligned and the wrong rib is pressed into the wrong groove but allowing interlocking when both ribs and grooves are aligned.

10 Claims, 1 Drawing Sheet

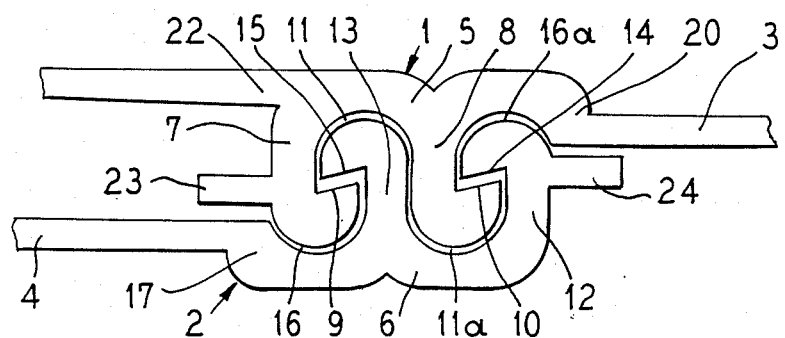
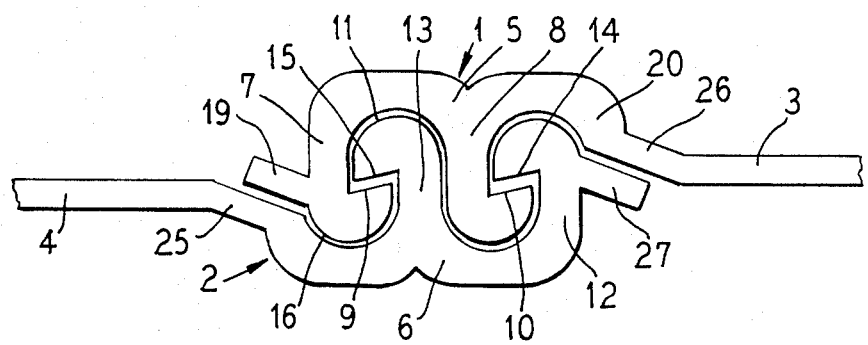
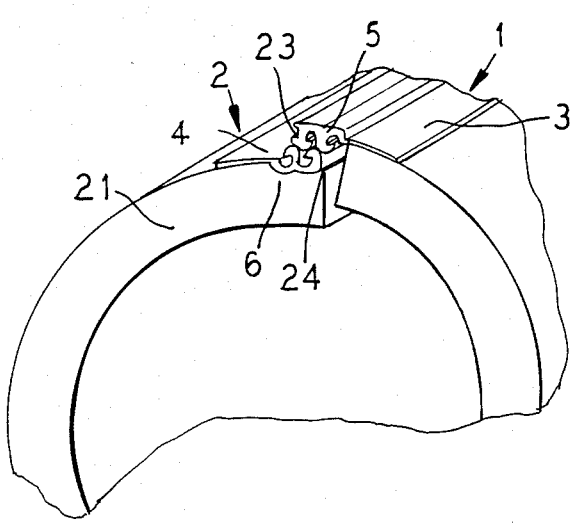

PLASTIC INTERLOCKING FASTENER STRIPS

BACKGROUND OF THE INVENTION

The present invention relates to improvements in flexible fastener zipper strips of the type having projecting ribs and grooves shaped to interlock with each other when pressed together and to release when pulled apart.

More particularly, the invention relates to continuous plastic strips of the type which can be manufactured at high speed by extruding the plastic fastener strips out of extrusion heads. The strips can be formed with the web so as to be attached to adjoining sheets to be joined or can be integral with the sheets. In this type of fastening strip, each strip is manufactured with ribs and grooves of the same size and shape thus making it possible to extrude only a single strip out of a single extrusion head with the strip matched to itself for interlocking. Each strip has a plurality of ribs and a plurality of grooves with the ribs sized and shaped to interlock in the grooves when the strips are pressed together.

With a construction which embodies a plurality of ribs and a plurality of grooves in each strip of the same size and shape, it is possible that when the strips are to be joined, the ribs and grooves can be improperly oriented so that the ribs will enter the wrong grooves and an insecure or improper attachment will be made. If the attachment is such that not all of the ribs are interlocked into all of the grooves, a connection of inadequate strength will result and perhaps a connection which will leak or at least not offer adequate sealing. Because the ribs and grooves are quite small, it is easy for an operator to inadvertently push the wrong rib into the wrong groove which results in an improper closure. In an example which is illustrated in the drawings, strips are shown with two ribs and two grooves, and it is quite possible without the features of the present invention for an operator to push the outermost rib into the outermost groove so that only one rib and one groove interlock and the innermost ribs and grooves do not engage. This would result in an improper inadequate closure between the fastener strips.

FEATURES OF THE INVENTION

It is accordingly an object of the present invention to provide an improved fastener strip structure having plural ribs and grooves wherein inadvertent improper joining of the ribs and grooves is prevented and full and correct interlocking is assured.

A further object of the invention is to provide a fastener strip structure, particularly one that is well adapted utilizing two ribs and two grooves on each fastener strip wherein assurance is had that both ribs and grooves will interlock and the improper orientation wherein only one rib and groove interlock is prevented.

A further object of the invention is to provide an improved fastener structure employing continuous rib and groove interlocking profiles which can be manufactured with substantially no additional expense or time required and yet the strips are designed so that correct interlocking is assured.

In accordance with the invention, fastener strips are provided having rib and groove profiles extending therealong. For an optimum strength weight of plastic ratio, the structure is designed to have ribs and grooves wherein each strip of the ribs and grooves are the same size. This structure normally will permit the insertion and interlocking of the wrong rib into the wrong groove and particularly wherein such interlocking results in only one rib interlocking in one groove rather than both ribs and grooves interlocked for maximum strength and sealing. A uniquely located and constructed projection is provided on one of the ribs which projection will interfere or engage with a rib on the other strip if the ribs and groove are not properly oriented and aligned with the projection preventing interlocking when improper orientation is made. However, when the ribs and grooves are properly oriented with the correct ribs opposite the correct grooves, the projection will not interfere with the interlocking. Further, the projection is so located as to add additional strength to elements of the fastener particularly when they are interlocked.

A feature of the invention is providing a projecting ridge along the outer surface of the distal or outermost rib. This ridge is located so that it will interfere with or engage a rib of the opposing strip if the ribs and grooves are not properly aligned. However, the ridge has a further function in that it lends substantially to the strength of the outermost rib. In a continuous fastener if substantial forces are applied to the fastener strips which tend to separate them, the ribs will tend to pull out of the grooves by bending. The ridge is so located so as to strengthen the rib preventing localized bending thereby making it possible to obtain a fastener which is stronger than those heretofore available. Or, the fastener with its increased strength can utilize ribs and grooves of reduced size so that the additional plastic required for the provision of the ridge is compensated for and the structure permits the provision of the strips with a ridge requiring no extra plastic in totality for the strips.

Other objects, advantages and features will become more apparent with the teachings of the principles of the invention in connection with the disclosure of the preferred embodiments in the specification, claims, and drawing in which:

DESCRIPTION OF THE DRAWINGS

FIG. 1 is a cross-sectional view taken through interlocked closures strips constructed in accordance with the principles of the present invention;

FIG. 2 is a sectional view taken through two interlocked closure strips illustrating a modified embodiment of the invention; and FIG. 3 is a perspective view illustrating closure strips constructed in accordance with the invention being utilized for attaching the edges of a split tube, and how improper interlocking is prevented.

DESCRIPTION OF THE PREFERRED EMBODIMENTS

FIG. 1 illustrates first and second closure strips 1 and 2 which are shown in their interlocked relationship. The strips have web portions 3 and 4 which permit attachment of the strips to members to be joined by the strips. An example of members to be joined is shown in FIG. 3 and will be described further in connection with that Figure. While the strips are shown having webs 3 and 4, in some circumstances, the strips may be integral with two continuous sheets, being manufactured and extruded therewith, and the features of the fastener are not limited to any single use of the fasteners.

The interconnecting portions of the strips are shown by the heads 5 and 6 which have the interlocking profiles thereon.

Each of the strips is of essentially identical construction having plural ribs and plural grooves extending continuously therealong. The strips as illustrated have a pair or first and second ribs 7 and 8 for the strip 1. The opposing strip has identical ribs and the ribs are shaped so as to enter into opposing mating grooves and also to interlock with each other, being provided with hooks 9 and 10. The hooks provide angular surfaces which engage in face-to-face relationship with surfaces 14 and 15 with ribs 13 and 14 of the opposing strip.

For correct interengagement of the strips, the strips 1 and 2 are pressed together by applying pressure to their heads 5 and 6 and the ribs of each strip enter the grooves of the opposing strip. Each of the grooves of each strip are of generally the same size and each of the ribs of each of the strips are of generally the same size. This construction, while providing for optimum strength for a given size of the plastic heads, permits inadvertent or improper interlocking. For example, the outermost or distal rib 7, for the first strip 1 can improperly be pressed into the groove properly occupied by the rib 8. Similarly, if this improper orientation occurs, the distal or outermost rib 12 of the lower strip 2 will improperly groove occupied by the head 13. This will result in interlocking between only two dital ribs 7 and 12 and the innermost ribs 8 and 13 will not contribute to the interlocking strength of the fastener.

In order to prevent the interlocking which would occur from improper orientation and in order to prevent the wrong rib from inadvertently being inserted into the incorrect groove, a blocking means is provided. This blocking means is shown in a preferred form in FIG. 1 as a boss or ridge 23 which projects outwardly at approximate right angles to the rib 7. An identical boss or ridge 24 projects outwardly from the outermost rib 12.

The ribs and grooves are shown in FIG. 1 as correctly interlocked with the ribs 7 and 8 inserted into the grooves 16 and 11a respectively. The ribs 12 and 13 are properly inserted into the grooves 16a and 11.

If the strips are improperly oriented and the rib 7 is attempted to be pushed into the groove 11a, the ridge 23 will engage the tip of the rib 13 thereby blocking the interlocking of the strips in their incorrect position. Similarly, the ridge 24 will engage the outer head of the rib 7 thereby preventing the head 12 from entering the groove 11.

Thus, the ridges 23 and 24 provide blocking means which do not interfere with the proper orientation and interlocking of the strips but prevent improper interlocking.

The ridges project at approximate right angles to the ribs to which they are attached thereby strengthening the ribs. This reinforces the beam strength of the ribs acting as a backbone for the rib. The strengthening of the rib creates a stronger fastener and a stronger interlock.

As illustrated in FIG. 1, an additional pull flange 22 may be provided on the upper strip for manually pulling the fastener strips apart when they are to be manually separated. If desired, a pull flange similar to 22 may be provided on the lower strip 2.

FIG. 2 illustrates a modified form of the fastener strips wherein the webs lie more closely to a common plane. This is made possible by the webs having an angled portion, 25 for the lower fasteners 2, and 26 for the upper fastener 1. Ridges 19 and 27 are provided projecting outwardly from the outermost rib 7 and 12. In other respects, the fastener strips are of the same construction as FIG. 1 and like numerals indicate like parts.

FIG. 3 illustrates a strip having the construction embodying the features of the invention as used in strips to attach the edges of an annular tube such as an insulation tube used to surround a pipe. The insulation tube is shown at 21 and fastener strips are attached to the tube by the web portions 3 and 4. FIG. 3 illustrates what can occur if the strips are improperly oriented and the outermost rib 23 is attempted to be pushed into the outermost groove. The outermost rib 24 of the lower strip also then is in alignment with the outermost groove of the upper strip. As will be seen, the ridge which projects from the shoulder or edge of each of the outermost ribs will engage the inner rib of the opposing strip preventing the rib from entering the groove. Only when the operator properly orients the ribs and grooves so that both will interlock when pressed together, will interlocking be permitted the structure.

Thus, the structure prevents improper weak interlocking which might occur in the absence of the structure including the blocking means. The ridge which extends along the back surface of the outer rib acts as a backbone preventing bending of the rib out of its plane alone its length. In order for the rib to jump out of its groove to start to open the fastener, the rib has to bend outwardly at the location where it first jumps out of the groove. The reinforcing backbone ridge, in addition to functioning as a blocking member, acts as a strengthening member resisting the separation of the strips. Since the ridge is manufactured continuous with the rib and since it projects in a direction to have a beam strength, the resistance to bending of the rib is increased and a stronger fastener results. Because the fastener is stronger, it can be made lighter weight with the use of less plastic thereby compensating for the additional plastic required by the provision of the ridge.

Thus, it will be seen there has been provided a structure which not only strengthens the effectiveness of the rib and groove interlock but which prevents incorrect orientation and blocking of the incorrect rib into the incorrect groove.

I claim:

1. An interlocking flexible fastener comprising in combination:

confronting first and second fastener members each having web portions and each having releasably interlocking profile portions extending continuously therealong at the edge of the web portion, a first profile portion having a female inner groove and a female outer groove outwardly of the inner groove relative to the web, a second profile portion having a male inner rib and a male outer rib outwardly of the web portion, said ribs being complementary shaped to the grooves to interlock therein with the outer rib properly lockable in the inner groove and the inner rib properly lockable in the outer groove, each of said ribs being of the same size and shape and each of said grooves being of the same size and shape as each other and as the ribs;

and a blocking element on one of said ribs preventing said outer rib from entering said outer groove so that proper interlocking is effected only by the outer rib locking in the inner groove and the inner rib locking in the outer groove.

2. An interlocking flexible fastener constructed in accordance with claim 1:
wherein said blocking consists of a projection extending from the outer rib.

3. An interlocking flexible fastener constructed in accordance with claim 1:
wherein said strips are flexible extruded plastic with the blocking means comprising a projection integral with the strips and of the same material.

4. An interlocking flexible fastener comprising in combination:
confronting first and second fastener members each having web portions and each having releasably interlocking profile portions extending continuously therealong, said first portion having female first and second grooves, said second portion having male first and second ribs complementary shaped to the grooves to interlock therein;
each of said ribs being of the same size and shape and each of said grooves being of the same size and shape;
and each of said first ribs having a blocking element positioned to permit entry of the first ribs into the first grooves but engaging the second ribs to prevent entry of the first ribs into the second grooves.

5. A fastener structure having continuous releasably interlocking profiles comprising in combination:
opposed flexible plastic continuous fastener strips adapted to be releasably interlocking to each other;
one strip having a plurality of ribs thereon the same size and shape;
the other strip having a groove thereon shaped and sized to mate with any one of said ribs;
one of said ribs being an insertion ib for properly interlocking with the groove and the other of said ribs being an incorrect rib for not interlocking with said groove; and
blocking means on one said strips projecting from a rib blocking entry of sa incorrect rib into said groove so that only the correct rib will be interlocked and so that the incorrected ribs will not be inadvertently inserted into said groove.

6. A fastener structure having continuous interlocking profiles thereon comprising in combination:
opposed flexible continuous fastener strips adapted to be releasably interlocked to each other and having web portions extending in opposite directions so that the strips interlock the web portions extending away from each other;
each strip being complementary shaped with a pair of projecting ribs and with a pair of grooves for receiving the ribs of the other strip;
a projecting boss extending along the distal rib of the pair of each strip and positioned to engage the rib of the opposite strip and prevent interlocking when the strips are improperly aligned;
said boss strengthening the rib against lateral bending;
said boss located to permit entry of the ribs into the grooves with proper orientation between the strips.

7. A fastener structure having continuous interlocking profiles thereon constructed in accordance with claim 6:
wherein said ribs and grooves of each strips of said boss are continuous therealong and are formed by continuous plastic extrusion.

8. A fastener structure having continuous interlocking profiles thereon constructed in accordance with claim 6:
wherein said boss constitutes a continuous member extending parallel to the ribs and grooves.

9. A fastener structure having continuous interlocking profiles thereon constructed in accordance with claim 6:
including a web for each of the strips and said boss extends substantially parallel to said web.

10. A fastener structure having continuous interlocking profiles thereon constructed in accordance with claim 6:
wherein said fastener strips have plural ribs and said boss extends at substantially right angles to the outermost rib as a backbone for the rib preventing localized bending.

* * * * *